US011429799B1

(12) United States Patent
Chen et al.

(10) Patent No.: US 11,429,799 B1
(45) Date of Patent: Aug. 30, 2022

(54) PROXIMITY CARD READER TESTBED (71) Applicant: Turing Video, San Mateo, CA (US)

(72) Inventors: Weiwei Chen, Belmont, CA (US);
Chien-Yu Chen, San Mateo, CA (US);
Tian Xie, San Mateo, CA (US)

(73) Assignee: Turing Video, San Mateo, CA (US)

( * ) Notice: Subject to any disclaimer, the term of this patent is extended or adjusted under 35 U.S.C. 154(b) by 0 days.

(21) Appl. No.: 17/224,030

(22) Filed: Apr. 6, 2021

(51) Int. Cl.
*G06K 7/08* (2006.01)
*G06K 7/10* (2006.01)

(52) U.S. Cl.
CPC .............................. *G06K 7/10297* (2013.01)

(58) Field of Classification Search
CPC ............ G06K 7/10297; G06K 7/0095; G01R 1/07328
USPC .......................................................... 235/451
See application file for complete search history.

(56) References Cited

U.S. PATENT DOCUMENTS

| 7,053,636 | B2 * | 5/2006 | Sudin | G01R 1/07314 |
| | | | | 324/755.05 |
| 9,983,145 | B1 * | 5/2018 | Chen | G01N 21/8806 |
| 10,262,174 | B1 * | 4/2019 | Kinder | G06K 7/0073 |
| 10,846,490 | B1 * | 11/2020 | Tantiwuttipong | G07F 7/088 |
| 2005/0261861 | A1 * | 11/2005 | Schahl | H04N 17/04 |
| | | | | 348/E17.005 |
| 2016/0321475 | A1 * | 11/2016 | Frier | G01R 31/2822 |
| 2018/0253572 | A1 * | 9/2018 | Ryan | G06K 7/0095 |
| 2019/0033206 | A1 * | 1/2019 | Spoettl | G06K 19/07 |

* cited by examiner

*Primary Examiner* — Ahshik Kim
(74) *Attorney, Agent, or Firm* — Sheppard Mullin Richter & Hampton LLP (57) ABSTRACT

The present invention extends to methods, systems, and computer program products for testing proximity card readers. Aspects include proximity card reader test bed environments configured to test proximity card readers with a plurality of proximity cards while minimizing human involvement. A proximity card reader can be tested to determine a likelihood of the proximity card reader functioning as intended over time and to determine proximity card reader compatibility with different proximity card formats. Proximity card reader failures (e.g., crashes) and incompatibilities can be detected in the testbed environment reducing the likelihood of deploying defective and/or incompatible card readers into operation.

19 Claims, 5 Drawing Sheets

FIG. 1

```
┌─────────────────────────────────────────────────────────────────┐
│ VERTICALLY MOVING A CONNECTING ROD ALIGNING A PLATTER INCLUDING AN │ 201
│ ATTACHED FIRST PROXIMITY CARD AND AN ATTACHED SECOND PROXIMITY CARD│
│              WITH A PROXIMITY CARD READER                           │
└─────────────────────────────────────────────────────────────────┘
                              ▼
┌─────────────────────────────────────────────────────────────────┐
│         ROTATIONALLY MOVING THE CONNECTING ROD, INCLUDING:         │ 202
│  ┌───────────────────────────────────────────────────────────┐   │
│  │   ROTATING THE PLATTER MOVING THE FIRST PROXIMITY CARD INTO │ 203
│  │   READING RANGE OF THE PROXIMITY CARD READER AND THEN OUT  │   │
│  │       OF READING RANGE OF THE PROXIMITY CARD READER        │   │
│  └───────────────────────────────────────────────────────────┘   │
│                              ▼                                    │
│  ┌───────────────────────────────────────────────────────────┐   │
│  │   ROTATING THE PLATTER MOVING THE SECOND PROXIMITY CARD    │ 204
│  │   INTO READING RANGE OF PROXIMITY CARD READER AND THEN OUT │   │
│  │       OF READING RANGE OF THE PROXIMITY CARD READER        │   │
│  └───────────────────────────────────────────────────────────┘   │
└─────────────────────────────────────────────────────────────────┘
                              ▼
┌─────────────────────────────────────────────────────────────────┐
│ VERTICALLY MOVING THE CONNECTING ROD AGAIN UNALIGNING THE PLATTER  │ 205
│   WITH THE PROXIMITY CARD READER AND ALIGNING ANOTHER PLATTER     │
│  INCLUDING AN ATTACHED THIRD PROXIMITY CARD AND AN ATTACHED       │
│       FOURTH PROXIMITY CARD WITH THE PROXIMITY CARD READER        │
└─────────────────────────────────────────────────────────────────┘
                              ▼
┌─────────────────────────────────────────────────────────────────┐
│       ROTATIONALLY MOVING THE CONNECTING ROD AGAIN, INCLUDING:     │ 206
│  ┌───────────────────────────────────────────────────────────┐   │
│  │   ROTATING THE OTHER PLATTER MOVING THE THIRD PROXIMITY CARD│ 207
│  │   INTO READING RANGE OF PROXIMITY CARD READING AND THEN    │   │
│  │       OUT OF READING RANGE OF THE PROXIMITY CARD READER    │   │
│  └───────────────────────────────────────────────────────────┘   │
│                              ▼                                    │
│  ┌───────────────────────────────────────────────────────────┐   │
│  │   ROTATING THE PLATTER AGAIN MOVING THE FOURTH PROXIMITY   │ 208
│  │   CARD INTO READING RANGE OF PROXIMITY CARD READER AND     │   │
│  │       THEN OUT OF READING RANGE OF THE PROXIMITY CARD READER│   │
│  └───────────────────────────────────────────────────────────┘   │
└─────────────────────────────────────────────────────────────────┘
```

PROXIMITY CARD READER TESTBED

TECHNICAL FIELD

The present disclosure relates generally to testing proximity card readers, and more particularly, to a proximity card reader test bed.

BACKGROUND

Many facilities implement physical access control limiting who can enter, defining when entry is appropriate, and regulating how many people can be in a facility at a time. For example, a facility may desire to limit facility access to employees and approved visitors. Access control is often implemented using proximity card readers and proximity cards. For example, employees and approved visitors can be assigned proximity cards that are scanned at proximity card readers to gain access to the facility and/or move between locations within the facility.

As with all electronic devices, proximity card readers may be defective and/or can crash from time to time. When a proximity card reader crashes during operation, facility access can become more difficult, potentially wasting time and resources of those (at least temporarily) denied facility access. Further, many proximity card readers and corresponding proximity cards utilize proprietary data formats, reducing cross-compatibility and leading to incompatibilities. However, manufacturers are not always clear and/or forthcoming about proximity card reader and proximity card compatibilities. Thus, customers may unknowingly invest in proximity cards that are incompatible with existing proximity card readers.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for testing proximity card readers. Aspects include proximity card reader test bed environments configured to test proximity card readers with a plurality of proximity cards while minimizing human involvement. A proximity card reader can be tested to determine a likelihood of the proximity card reader functioning as intended over time. Proximity card reader failures (e.g., crashes) can be detected in the testbed environment reducing the likelihood of deploying a defective card reader into operation.

A card reader testbed environment can also be used to determine proximity card reader compatibility with different proximity card formats. Some proximity card formats may be incompatible with some proximity card readers. For example, some proximity car readers are configured to read specialized proximity card formats. Scanning other proximity cards (not of the specialized format) at the proximity card reader can cause the proximity card reader to crash. Determining proximity card/proximity card reader compatibility in the test bed environment reduces the likelihood of incompatibilities and/or crashes after deploying a proximity card reader into operation.

In this description and the following claims, a "proximity card" is defined as a contactless smart card which can be read without inserting it into a reader device. Proximity cards are contactless card technologies. A proximity card can be held near a proximity card reader for a moment enabling the proximity card reader to read data from the proximity card. Proximity cards can be encoded with data including a card (e.g., bit) format, one or more facility codes, a card sequence (e.g., a numerical identifier), and parity bits. Proximity card is defined to include 125 kHz cards and 13.56 MHz cards. A proximity card can be powered by radio frequency signals from a proximity car reader or by an internal battery. A proximity card can further include an antenna (a coil of wire), a capacitor, and an integrated circuit containing encoded data. Passive proximity cards can have a read range of up to 15 inches. Active proximity cards (i.e., battery powered) can have a read range up to 6 feet.

In this description and the following claims, a "proximity card reader" is defined as an electronic device for reading proximity cards. A proximity card reader can include an antenna that continuously transmits a short range radio frequency field. When a proximity card is within read range of the proximity card reader, the proximity card reader and the proximity card communicate using resonant energy transfer. The antenna coil and capacitor in the proximity card (which form a tuned circuit) absorb and store energy from the field, resonating at the frequency emitted by the proximity card reader. The integrated circuit sends encoded data (e.g., card format, facility code, and card sequence) to the antenna, which transmits the data by radio frequency signals to the proximity card reader.

A proximity card reader can be connected to a controller or computer system maintaining a list of authorized cards. The proximity card reader can refer to the list to determine if a scanned card is an authorized card. The proximity card reader can perform a function when a scanned card is an authorized card or can perform a different function (or no function) when a scanned card is not an authorized card.

Figure 1:
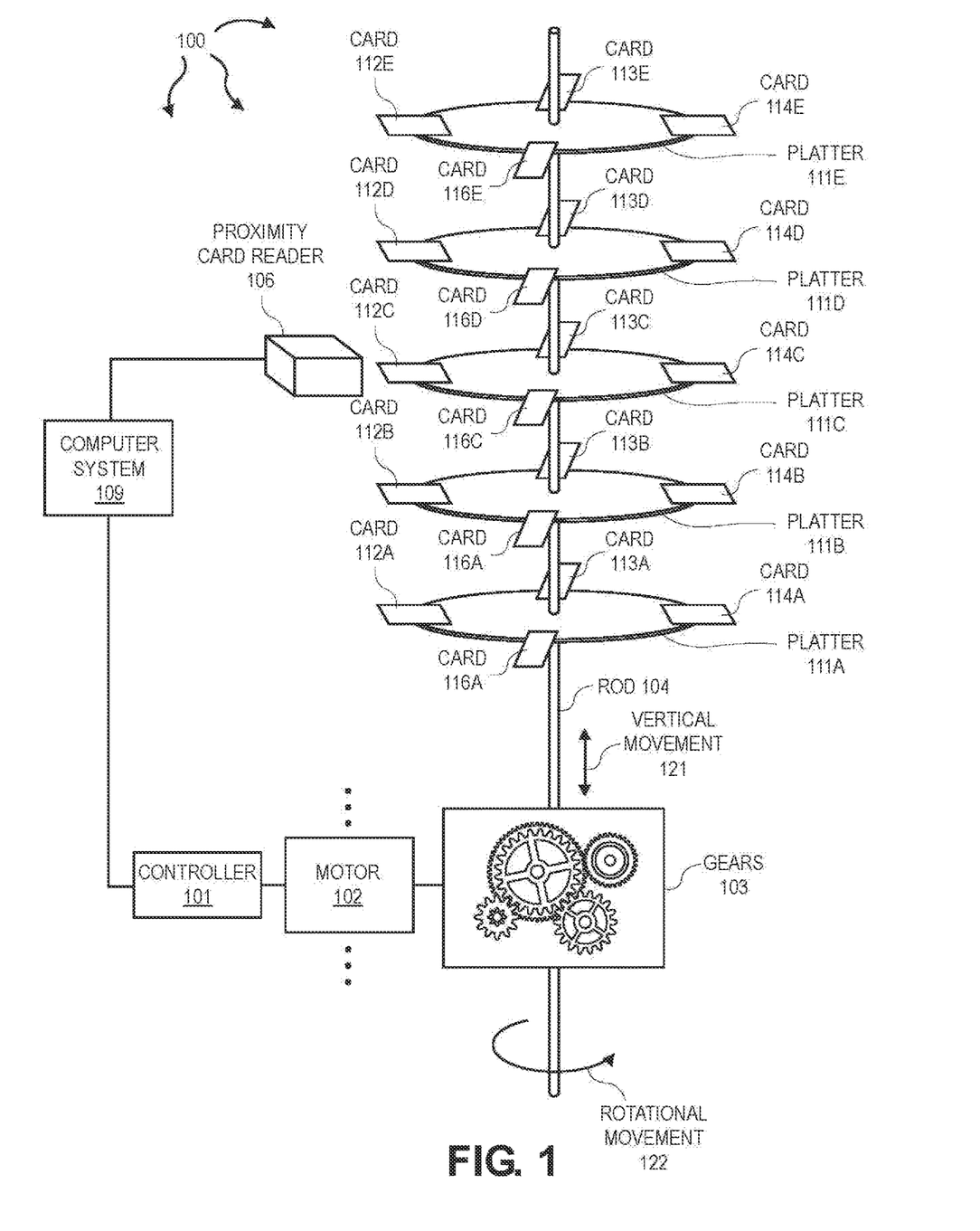
FIG. 1 illustrates an example proximity card reader testbed environment.

FIG. 1 illustrates an example proximity card reader testbed environment 100. As depicted, testbed 100 includes controller 101, motor 102, gears 103, rod 104, proximity card reader 106, platters 111A-111E, and computer system 109. Each of platters 111A-111E include a plurality of cards connected near the platter edge. For example, platter 111A incudes cards 112A, 113A, 114A, and 116A. Platter 111B incudes cards 112B, 113B, 114B, and 116B. Platter 111C incudes cards 112C, 113C, 114C, and 116C. Platter 111D incudes cards 112D, 113D, 114D, and 116D. Platter 111E incudes cards 112E, 113E, 114E, and 116E.

Different proximity cards from among cards 112A, 113A, 114A, 116, 112B, 113B, 114B, 116B, 112C, 113C, 114C, 116C, 112D, 113D, 114D, 116D, 112E, 113E, 114E, and 116E can be encoded with different formats, facility codes, and card sequences. Encoding proximity cards differently facilitates more diverse and robust proximity card reader testing.

Platters 111A-111E can be mechanically connected to rod 104, for example, welded, with adhesive, etc. Thus, platters move similarly to rod 104. When rod 104 is rotated, platters 111A-111E correspondingly rotate. When rod 104 is moved vertically (up or down), platters 111A-111E correspondingly move vertically (up or down).

In general, controller 101 controls activation of motor 102. When activated, motor 102 can turn gears 103 causing vertical movement 121 of rod 104 and/or rotational movement 122 of rod 104. Vertical movement 121 (up or down) can be implemented to align a platter with proximity card reader 106. For the aligned platter, rotational movement 122 (clockwise or counter clockwise) can be implemented to move different proximity cards into and out of reading range of proximity card reader 106. Controller 101 can regulate motor 102 controlling the speed of rotational movement 122 such that all proximity cards on a platter are read in an appropriate amount of time, such as, between 5-15 seconds.

When cards on an aligned platter have been read, additional vertical movement (e.g., up or down) can be implemented to align a different platter with proximity card reader 106. For the different aligned platter, additional rotational movement 122 can be implemented to move different proximity cards into and out of reading range of proximity card reader 106. Controller 101 can regulate motor 102 controlling the speed of vertical movement 121 such that platters are raised/lowered for alignment with proximity card reader 106 in an appropriate amount of time, such as, between 5-15 seconds. Initial testing configuration, for example, raising platter 111A above proximity card reader 106 or lowering platter 111E below proximity card reader 106 may take longer than platter alignment during testing.

The arrangement of platters as well as the arrangement of cards on a platter can be tailored based on and/or to accommodate the reading rage of proximity card reader 106. For example, platters 114A-114E can be spaced relative to one another such that proximity cards on platters above and below an aligned platter are out of reading range of proximity card reader 106. Cards on a platter can also be spaced relative to one another such that one, or at the most two cards, are in reading range of proximity card reader 106 at a time as rotational movement 122 is implemented.

Motor 102 can include multiple connections to gears 103. One connection can facilitate vertical movement 121 and another connection can facilitate rotational movement 122. Alternately, proximity card reader testbed 100 may include an additional motor connected to gears 103. Motor 102 can facilitate one of vertical movement 121 or rotational movement 122 and the other motor can facilitate the other of vertical movement 121 or rotational movement 122. Controller 101 can coordinate motor 102 and the other motor to facilitate vertical movement of rod 104 and rotational movement of rod 104.

Proximity card reader 106 can capture data (e.g., card format, facility code, and card sequence) from proximity cards that are within the reading range of proximity card reader. Captured data can include card format, facility code, and card sequence. Proximity card reader can send captured card data to computer system 109. Computer system 109 can attempt to validate captured card data. Computer system 109 can also detect if/when card reader 106 crashes. Computer system 109 can include a file or database of card data (e.g., card format, facility code, and card sequence) for proximity cards 112A, 113A, 114A, 116, 112B, 113B, 114B, 116B, 112C, 113C, 114C, 116C, 112D, 113D, 114D, 116D, 112E, 113E, 114E, and 116E. Validation can include comparing captured card data to the file or database of card data.

When captured card data is validated, computer system 109 can send signals to controller 101 to continue with testing, for example, to continue rotational movement 122, to implement additional vertical movement 121 to align a new platter, etc. When captured card data is not validated or proximity card reader 106 crashes, computer system 109 can send signals to controller 101 to stop testing, for example, stopping rotational movement and/or freezing an aligned platter, and can send notification to test personnel. Human personnel can intervene and make further determinations with respect to functionality of proximity card reader 106 and/or a proximity card.

Figure 2:
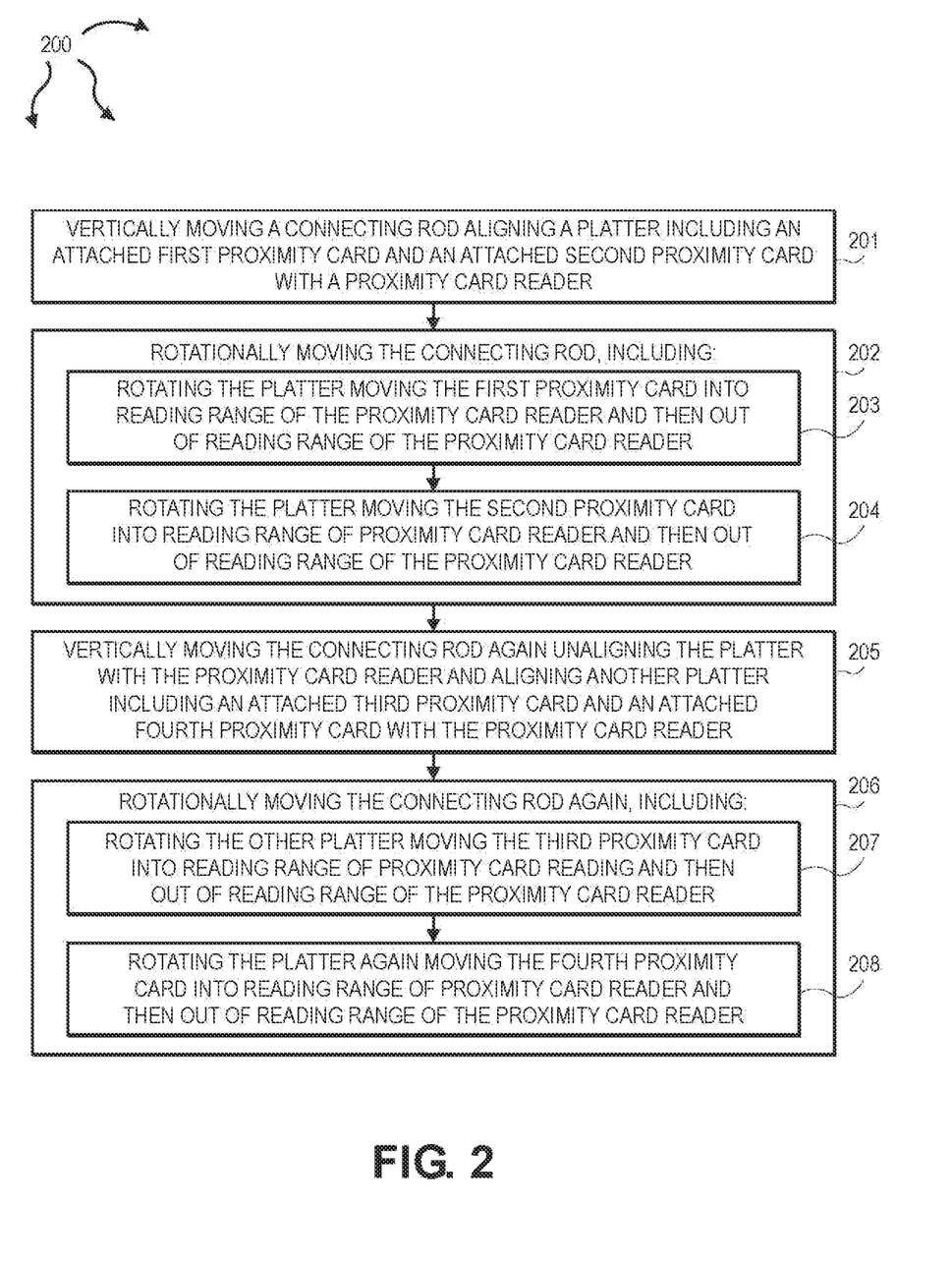
FIG. 2 illustrates a flow chart of an example method for testing a proximity card reader.

FIG. 2 illustrates a flow chart of an example method 200 for testing a proximity card reader. Method 200 will be described with respect to the components and data in proximity card reader testbed environment 100.

Method 200 includes vertically moving a connecting rod aligning a platter including an attached first proximity card and an attached second proximity card with a proximity card reader (201). For example, controller 101 can activate motor 102. In turn, motor 102 can turn gears 103 implementing vertical movement 121 of rod 104 and aligning platter 111C with proximity card reader 106.

Method 200 includes rotationally moving the connecting rod (202). For example, motor 102 can turn gears 103 implementing rotational movement 122 of rod 104.

Rotationally moving the connecting rod includes rotating the platter moving the first proximity card into reading range of the proximity card reader and then out of reading range of the proximity card reader (203). For example, rotational movement 122 can move card 112C into reading range of proximity card reader 106 and then out of reading range of proximity card reader 106. When proximity card 112C is in reading range, proximity card reader 106 can capture data from proximity card 112C. Proximity card reader 106 can send the captured data to computer system 109. Computer system 109 can validate the captured data and instruct controller 101 to continue testing.

Rotationally moving the connecting rod includes rotating the platter moving the second proximity card into reading range of proximity card reader and then out of reading range of the proximity card reader (204). For example, rotational movement 122 can move card 113C into reading range of proximity card reader 106 and then out of reading range of proximity card reader 106. Card 113C can be moved into reading range of proximity card reader 106 as card 112C is being moved out of reading range of proximity card reader 106. When proximity card 113C is in reading range, proximity card reader 106 can capture data from proximity card 113C. Proximity card reader 106 can send the captured data to computer system 109. Computer system 109 can validate the captured data and instruct controller 101 to continue testing.

Further testing can include continued rotational movement 122 moving cards 114C and 116C into reading range of proximity card reader 106 and then out of reading range of proximity card reader 106. If all cards in platter 111C have been read, computer system 109 can instruct controller 101 to implement additional vertical movement 121 of rod 104.

Method 200 includes vertically moving the connecting rod again unaligning the platter with the proximity card reader and aligning another platter including an attached third proximity card and an attached fourth proximity card with the proximity card reader (205). For example, controller 101 can activate motor 102. In turn, motor 102 can turn gears 103 implementing further vertical movement 121 of rod 104. The further vertical movement 122 can unalign platter 111C with proximity card reader 106. In one aspect, further vertical movement 122 moves rod 104 up and corresponding moves platter 111B into alignment with proximity card reader 106. In another aspect, further vertical movement 122 moves rod 104 down and corresponding moves platter 111D into alignment with proximity card reader 106.

Method 200 incudes rotationally moving the connecting rod again (206). For example, motor 102 can turn gears 103 implementing additional rotational movement 122 of rod 104.

Rotationally moving the connecting rod again can include rotating the other platter moving the third proximity card into reading range of proximity card reader and then out of reading range of the proximity card reader (207). For example, in one aspect (when further vertical movement 121 is up), rotational movement 122 can move card 112B into reading range of proximity card reader 106 and then out of reading range of proximity card reader 106. When proximity card 112B is in reading range, proximity card reader 106 can capture data from proximity card 112B. Proximity card reader 106 can send the captured data to computer system 109. Computer system 109 can validate the captured data and instruct controller 101 to continue testing.

In another aspect (when further vertical movement 121 is down), rotational movement 122 can move card 112D into reading range of proximity card reader 106 and then out of reading range of proximity card reader 106. When proximity card 112D is in reading range, proximity card reader 106 can capture data from proximity card 112D. Proximity card reader 106 can send the captured data to computer system 109. Computer system 109 can validate the captured data and instruct controller 101 to continue testing.

Rotationally moving the connecting rod again can include rotating the platter again moving the fourth proximity card into reading range of proximity card reader and then out of reading range of the proximity card reader (208). For example, in the one aspect when further vertical movement 121 is up, rotational movement 122 can move card 113B into reading range of proximity card reader 106 and then out of reading range of proximity card reader 106. Card 113B can be moved into reading range of proximity card reader 106 as card 112B is being moved out of reading range of proximity card reader 106. When proximity card 113B is in reading range, proximity card reader 106 can capture data from proximity card 113B. Proximity card reader 106 can send the captured data to computer system 109. Computer system 109 can validate the captured data and instruct controller 101 to continue testing.

In the other aspect when further vertical movement 121 is down, rotational movement 122 can move card 113D into reading range of proximity card reader 106 and then out of reading range of proximity card reader 106. Card 113D can be moved into reading range of proximity card reader 106 as card 112D is being moved out of reading range of proximity card reader 106. When proximity card 113D is in reading range, proximity card reader 106 can capture data from proximity card 113D. Proximity card reader 106 can send the captured data to computer system 109. Computer system 109 can validate the captured data and instruct controller 101 to continue testing.

In aspects, every card on every platter is presented within the read range of proximity card reader 106. Initially, platter 111E can be aligned with proximity card reader 106. Rotational movement 122 can be implemented until proximity card reader 106 reads each of cards 112E, 113E, 114E, and 116E. Vertical movement 121 (up) can be implemented aligning platter 114D with proximity card reader 106. Rotational movement 122 can be implemented until proximity card reader 106 reads each of cards 112D, 113D, 114D, and 116D. Vertical movement 121 (up) can be implemented aligning platter 114C with proximity card reader 106. Rotational movement 122 can be implemented until proximity card reader 106 reads each of cards 112C, 113C, 114C, and 116C. Vertical movement 121 (up) can be implemented aligning platter 114B with proximity card reader 106. Rotational movement 122 can be implemented until proximity card reader 106 reads each of cards 112B, 113B, 114B, and 116B. Vertical movement 121 (up) can be implemented aligning platter 114A with proximity card reader 106. Rotational movement 122 can be implemented until proximity card reader 106 reads each of cards 112A, 113A, 114A, and 116A.

In other aspects, platter 111A is initially aligned with proximity card reader 106. Rotational movement 122 can be implemented until proximity card reader 106 reads each of cards 112A, 113A, 114A, and 116A. Vertical movement 121 (down) can be implemented to move other platters into alignment with proximity card reader and rotational movement 122 implemented to rotate cards on the other platters into and out of reading range of proximity card reader 106.

Other aspects can include a test bed environment with six or more platters or four or less platters. In additional aspects, each platter can include 5 or more proximity cards or 3 or less proximity cards.

Figure 3:
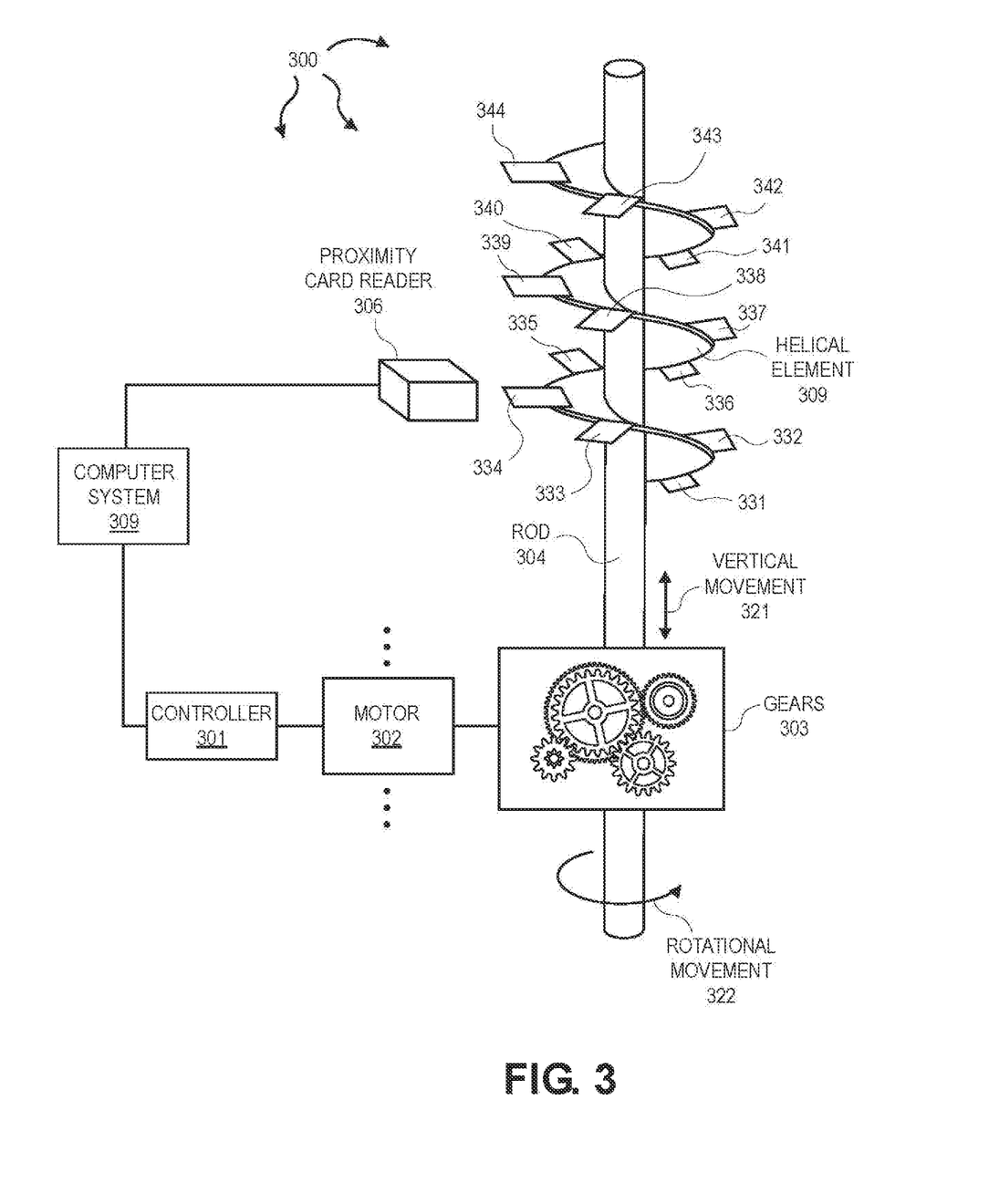
FIG. 3 illustrates another proximity card reader testbed environment.

FIG. 3 illustrates another proximity card reader testbed environment 300. As depicted, testbed 300 includes controller 301, motor 302, gears 303, rod 304, proximity card reader 306, helical element 309, and computer system 309. Proximity cards 331-344 are connected to the outer edge of helical element 309. Helical element 309 can be mechanically connected to rod 304, for example, welded, with adhesive, etc. Thus, helical element 309 moves similarly to rod 304. When rod 304 is rotated, helical element 309 correspondingly rotates. When rod 304 is moved vertically (up or down), helical element 309 correspondingly moves vertically (up or down).

In general, controller 301 controls activation of motor 302. When activated, motor 302 can turn gears 303 causing vertical movement 321 of rod 304 and/or rotational movement 322 of rod 304. Controller 301 can simultaneously implement and coordinate vertical movement 321 (up or down) and rotational movement 322 (clockwise or counter clockwise) to move different proximity cards, from among proximity cards 331-344, into and out of reading range of proximity card reader 306. Controller 301 can regulate motor 302 controlling the speed of vertical movement 321 and the speed of rotational movement 322 such that all proximity cards attached to helical element 109 are read in an appropriate amount of time, such as, between 15-60 seconds. Initial testing configuration, for example, raising proximity card 331 above proximity card reader 306 or lowering proximity card 334 below proximity card reader 306 can take less time than testing.

The arrangement of proximity cards 331-344 on helical element 309 can be tailored based on and/or to accommodate the reading rage of proximity card reader 306. For example, cards 331-344 can be spaced relative to one another such that one, or at the most two cards, are in reading range of proximity card reader 306 at a time as helical element 309 is moved through coordinated vertical and rotational movement.

Different proximity cards from among proximity cards 331-344 can be encoded with different formats, facility codes, and card sequences. Encoding proximity cards differently facilitates more diverse and robust proximity card reader testing.

Motor 302 can include multiple connections to gears 303. One connection can facilitate vertical movement 321 and another connection can facilitate rotational movement 322. Control 301 can coordinate the connections to implement simultaneous vertical movement and rotational movement of rod 304. Alternately, proximity card reader testbed 300 may include an additional motor connected to gears 303. Motor 302 can facilitate one of vertical movement 321 or rotational movement 322 and the other motor can facilitate the other of vertical movement 321 or rotational movement 322. Controller 301 can coordinate motor 302 and the other motor to facilitate simultaneous vertical and rotational movement of rod 304.

Proximity card reader 306 can capture data (e.g., card format, facility code, and card sequence) from proximity cards that are within the reading range of proximity card reader. Captured data can include card format, facility code, and card sequence. Proximity card reader can send captured card data to computer system 309. Computer system 309 can attempt to validate captured card data. Computer system 309 can also detect if/when card reader 306 crashes. Computer system 309 can include a file or database of card data (e.g., card format, facility code, and card sequence) for proximity cards 331-344. Validation can include comparing captured card data to the file or database of card data.

When captured card data is validated, computer system 309 can send signals to controller 301 to continue with testing, for example, to continue vertical movement 321 and rotational movement 322. When captured card data is not validated or proximity card reader 306 crashes, computer system 309 can send signals to controller 101 to stop testing, for example, stopping movement of rod 304, and can send notification to test personnel. Human personnel can intervene and make further determinations with respect to functionality of proximity car reader 306 and/or a proximity card.

Figure 4:
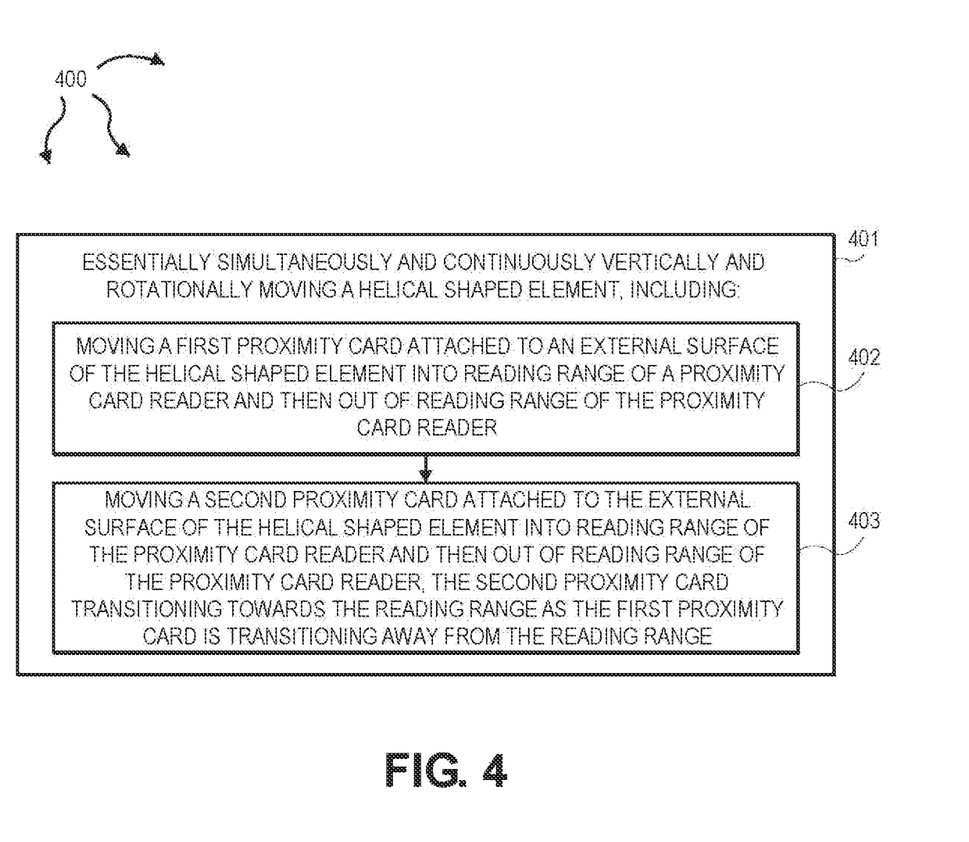
FIG. 4 illustrates a flow chart of another example method for testing a proximity card reader.

FIG. 4 illustrates a flow chart of another example method 400 for testing a proximity card reader. Method 400 will be described with respect to the components and data in proximity card reader testbed environment 300.

Method 400 includes essentially simultaneously and continuously vertically and rotationally moving a helical shaped element (401). For example, controller 301 can activate motor 102. Motor 102 can turn gears 103 simultaneously implementing vertical movement 321 and rotational movement 322 of rod 304/helical element 309.

Essentially simultaneously and continuously vertically and rotationally moving a helical shaped element includes moving a first proximity card attached to an external surface of the helical shaped element into reading range of a proximity card reader and then out of reading range of the proximity card reader (402). For example, card 334 can be moved into reading range of proximity card reader 306 and then out of reading range of proximity card reader 306. When proximity card 334 is in reading range, proximity card reader 306 can capture data from proximity card 334. Proximity card reader 306 can send the captured data to computer system 309. Computer system 309 can validate the captured data and instruct controller 101 to continue testing.

Further testing can include continued vertical movement 321 and rotational movement 321 moving a next proximity card into reading range of proximity card reader 306 and then and then out of reading range of proximity card reader 306.

Essentially simultaneously and continuously vertically and rotationally moving a helical shaped element includes moving a second proximity card attached to the external surface of the spiral shaped rod into reading range of the proximity card reader and then out of reading range of the proximity card reader, the second proximity card transitioning towards the reading range as the first proximity card is transitioning away from the reading range (403). For example, in one aspect when vertical movement is up and rotational movement is clockwise, card 333 can be moved into reading range of proximity card reader 306 and then out of reading range of proximity card reader 306. Card 333 can transition towards the reading range of proximity card reader 306 as card 334 is transitioning away from the reading range of proximity card reader 306

When proximity card 333 is in reading range, proximity card reader 306 can capture data from proximity card 333. Proximity card reader 306 can send the captured data to computer system 309. Computer system 309 can validate the captured data and instruct controller 301 to continue testing. Further testing can include continued vertical movement 321 and rotational movement 321 moving a next proximity card into reading range of proximity card reader 306 and then and then out of reading range of proximity card reader 306.

In another aspect when vertical movement is down and rotational movement is counter clockwise, card 335 can be moved into reading range of proximity card reader 306 and then out of reading range of proximity card reader 306. Card 335 can transition towards the reading range of proximity card reader 306 as proximity card 334 is transitioning away from the reading range of proximity card reader 306. When proximity card 335 is in reading range, proximity card reader 306 can capture data from proximity card 335. Proximity card reader 306 can send the captured data to computer system 309. Computer system 309 can validate the captured data and instruct controller 101 to continue testing.

In aspects, every card on helical element 309 is presented within the read range of proximity card reader 306. Initially, in one aspect, vertical movement 321 up can orient helical element 309 such that card 331 is above proximity card reader 306. Through simultaneous and continuous vertical movement 321 down and rotational movement 322 counter clockwise, each of proximity cards 331-344 can be transitioned into and then out of read range of proximity card reader 306. Initially, in another aspect, vertical movement 321 down can orient helical element 309 such that card 344 is below proximity card reader 306. Through simultaneous and continuous vertical movement 321 up and rotational movement 322 clockwise, each of proximity cards 344-331 can be transitioned into and then out of read range of proximity card reader 306.

Other aspects can include a test bed environment with different sized helical elements, such as, for example, a helical element longer or shorter than helical element 109. Helical elements can also include different numbers of proximity cards, for example, fewer than 14 attached proximity cards or more than 14 attached proximity cards attached.

Figure 5:
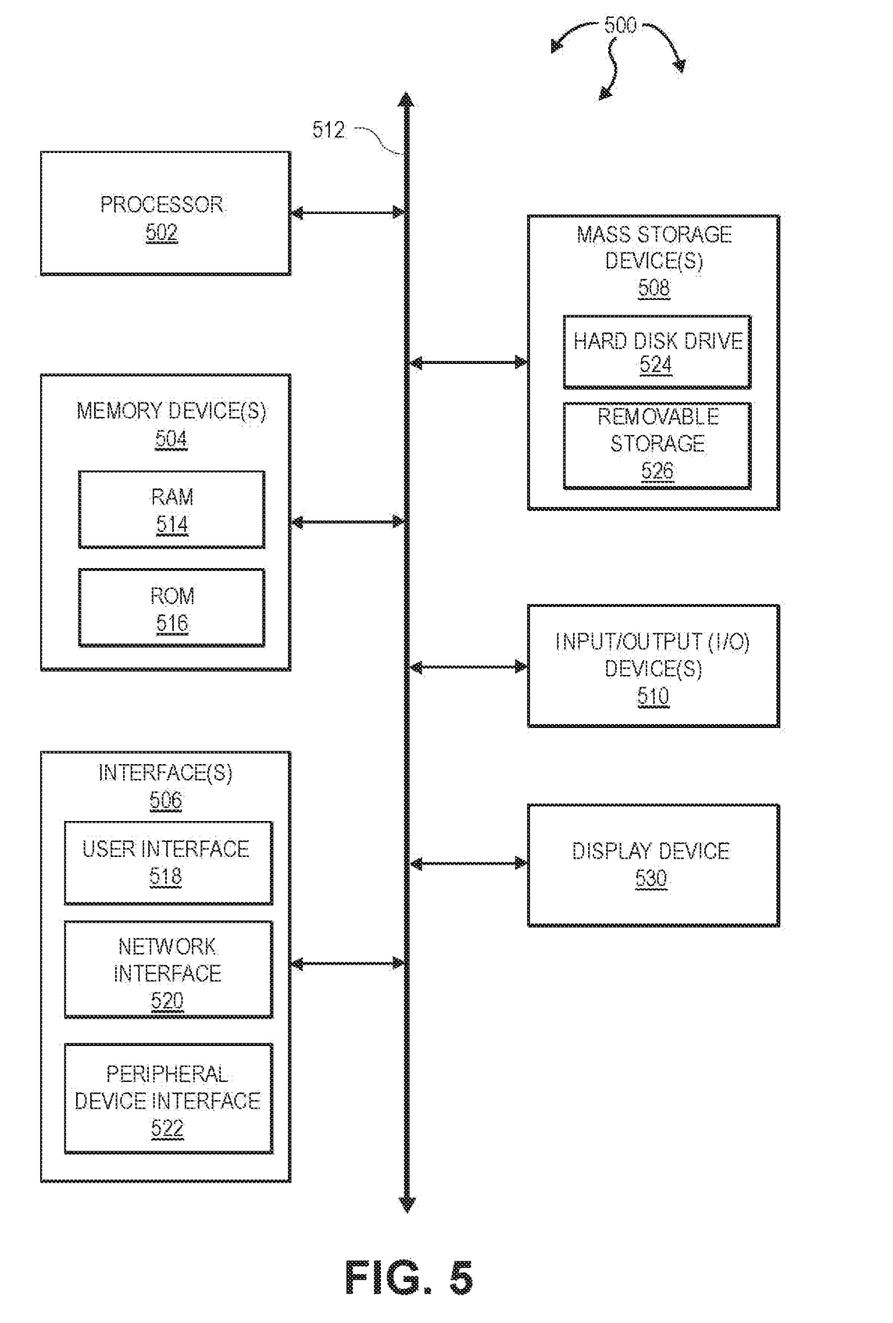
FIG. 5 illustrates an example block diagram of a computing device.

FIG. 5 illustrates an example block diagram of a computing device 500. Computing device 500 can be used to perform various procedures, such as those discussed herein. Computing device 500 can function as a server, a client, or any other computing entity. Computing device 500 can perform various communication and data transfer functions as described herein and can execute one or more application programs, such as the application programs described herein. Computing device 500 can be any of a wide variety of computing devices, such as a mobile telephone or other mobile device, a desktop computer, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer storage media, such as cache memory. Processor(s) 502 can be real or virtual and can be allocated from on-premise, cloud computing, or any cloud provider resources.

Memory device(s) 504 include various computer storage media, such as volatile memory (e.g., random access memory (RAM) 514) and/or nonvolatile memory (e.g., read-only memory (ROM) 516). Memory device(s) 504 may also include rewritable ROM, such as Flash memory. Memory device(s) 504 can be real or virtual and can be allocated from on-premise, cloud computing, or any cloud provider resources.

Mass storage device(s) 508 include various computer storage media, such as magnetic tapes, magnetic disks, optical disks, solid state memory/drives (e.g., Flash memory), and so forth. As depicted in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media. Mass storage device(s) 508 can be real or virtual and can be allocated from on-premise, cloud computing, or any cloud provider resources.

I/O device(s) 510 include various devices that allow data and/or other information to be input to or retrieved from computing device 500. Example I/O device(s) 510 include cursor control devices, keyboards, keypads, barcode scanners, microphones, monitors or other display devices, speakers, printers, network interface cards, modems, cameras, lenses, radars, CCDs or other image capture devices, and the like. I/O device(s) 510 can be real or virtual and can be allocated from on-premise, cloud computing, or any cloud provider resources.

Display device 530 includes any type of device capable of displaying information to one or more users of computing device 500. Examples of display device 530 include a monitor, display terminal, video projection device, and the like. Display device 530 can be real or virtual and can be allocated from on-premise, cloud computing, or any cloud provider resources.

Interface(s) 506 include various interfaces that allow computing device 500 to interact with other systems, devices, or computing environments as well as humans. Example interface(s) 506 can include any number of different network interfaces 520, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 518 and peripheral device interface 522. Interface(s) 506 can be real or virtual and can be allocated from on-premise, cloud computing, or any cloud provider resources.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 5394 bus, USB bus, and so forth. Bus 512 can be real or virtual and can be allocated from on-premise, cloud computing, or any cloud provider resources.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives (SSDs) (e.g., RAM-based or Flash-based), Shingled Magnetic Recording (SMR) devices, storage class memory (SCM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: captured card data, lists or databases of card data, controller signals, motor signals, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, captured card data, lists or databases of card data, controller signals, motor signals, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on premise and public, a combination of private and public, a combination of two different public cloud deployment models, etc. Thus, resources utilized in a hybrid cloud can span different locations, including on premise, private clouds, (e.g., multiple different) public clouds, etc.

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A card reader test bed comprising:
    a proximity card reader;
    a first rotatable platter;
    a first plurality of proximity cards attached to the first rotatable platter;
    a second rotatable platter;
    a second plurality of proximity cards attached to the second rotatable platter;
    a connecting rod connecting the first rotatable platter and the second rotatable platter and running through the first rotatable platter and the second rotatable; and
    one or more motors connected to the connecting rod and configured to move the connecting rod vertically and rotationally, vertical movement of the rod adjusting the height of the first and second rotatable platters relative to the proximity card reader aligning a platter from among the first rotatable platter and second rotatable platter with the proximity card reader, rotational movement of the rod rotating the first and second rotatable platters relative to the proximity card reader changing the distance between the proximity card reader and different proximity cards from among the first plurality of proximity cards and the second plurality of proximity cards and moving different cards attached to the aligned platter into and out of reading range of the proximity card reader.

2. The card reader test bed of claim 1, further comprising one or more additional rotatable platters.

3. The card reader test bed of claim 1, further comprising a controller configured to control the motor regulating the vertical movement speed of the rod and regulating the rotational movement speed of the rod.

4. The card reader test bed of claim 1, wherein a first plurality of proximity cards attached to the first rotatable platter comprises between four and six proximity cards being attached to the first rotatable platter.

5. The card reader test bed of claim 1, further comprising a computer system configured to validate card data captured by the proximity card reader.

6. A card reader test bed comprising:
    a proximity card reader;
    a rod;
    a helical shaped element mechanically connected to the rod;
    a plurality of proximity cards attached to an external edge of the helical shaped element and each card in plurality of proximity cards separated from other cards in plurality of proximity cards by at least a specified distance;
    a motor connected to the rod; and
    wherein the motor is configured to essentially simultaneously move the rod vertically and rotationally to move different proximity cards from among the plurality of proximity cards into and out reading range of the proximity card reader.

7. The card reader test bed of claim 6, further comprising a controller configured to control the motor regulating the speed of the essentially simultaneous vertical and rotational movement of the rod.

8. The card reader test bed of claim 6, wherein the plurality of proximity cards comprises between 10 and 20 proximity cards.

9. The card reader test bed of claim 6, further comprising a computer system configured to validate card data captured by the proximity card reader.

10. A method for testing proximity cards comprising:
    vertically moving a connecting rod aligning a platter including a plurality of attached proximity cards, including an attached first proximity card and an attached second proximity card with a proximity card reader;
    rotationally moving the connecting rod, including:
        rotating the platter moving the first proximity card into reading range of the proximity card reader and then out of reading range of the proximity card reader; and
        rotating the platter moving the second proximity card into reading range of proximity card reader and then out of reading range of the proximity card reader;
    vertically moving the connecting rod again unaligning the platter with the proximity card reader and aligning another platter including an attached third proximity card and an attached fourth proximity card with the proximity card reader; and
    rotationally moving the connecting rod again, including
        rotating the other platter moving the third proximity card into reading range of proximity card reader and then out of reading range of the proximity card reader; and
        rotating the platter again moving the fourth proximity card into reading range of proximity card reader and then out of reading range of the proximity card reader.

11. The method of claim 10, further comprising:
    further vertically moving the connecting rod unaligning the other platter with the proximity card reader and aligning a further platter including an attached fifth proximity card and an attached sixth proximity card with the proximity card reader; and
    further rotationally moving the connecting rod, including
        rotating the further platter moving the fifth proximity card into reading range of proximity card reader and then out of reading range of the proximity card reader; and
        rotating the platter again moving the sixth proximity card into reading range of proximity card reader and then out of reading range of the proximity card reader.

12. The method of claim 10 wherein vertically moving a connecting rod aligning a platter including an attached first proximity card and an attached second proximity comprises moving the connecting rod aligning the platter including an attached first proximity card, an attached second proximity card, and an attached third proximity card; and
    rotationally moving the connecting rod further includes rotating the platter moving the third proximity card into reading range of the proximity card reader and then out of reading range of the proximity card reader.

13. The method of claim 10, wherein vertically moving a connecting rod aligning a platter including a plurality of attached proximity cards vertically moving the connecting rod aligning the platter including between four and eight proximity cards.

14. The method of claim 10, further comprising:
    the proximity card reader capturing card data from the first proximity card; and
    sending the captured card data to a computer system.

15. The method of claim 14, further comprising:
the proximity card reader capturing card data from the third proximity card; and
detecting a proximity card reader crash.

16. A method for testing proximity cards comprising:
essentially simultaneously and continuously vertically and rotationally moving a rod, including:
- moving a first proximity card attached to an external surface of a helical shaped element into reading range of a proximity card reader and then out of reading range of the proximity card reader; and
- moving a second proximity card attached to the external surface of the helical shaped element into reading range of the proximity card reader and then out of reading range of the proximity card reader, the second proximity card transitioning towards the reading range as the first proximity card is transitioning away from the reading range.

17. The method of claim 16, wherein essentially simultaneously and continuously vertically and rotationally moving the rod further includes:
moving a third proximity card attached to the external surface of the helical shaped element into reading range of the proximity card reader and then out of reading range of the proximity card reader, the third proximity card transitioning towards the reading range as the second proximity card is transitioning away from the reading range.

18. The method of claim 16, further comprising:
the proximity card reader capturing card data from the first proximity card; and
sending the captured card data to a computer system.

19. The method of claim 18, further comprising:
the proximity card reader capturing card data from the second proximity card; and
detecting a proximity card reader crash.

* * * * *

UNITED STATES PATENT AND TRADEMARK OFFICE
CERTIFICATE OF CORRECTION

PATENT NO. : 11,429,799 B1
APPLICATION NO. : 17/224030
DATED : August 30, 2022
INVENTOR(S) : Weiwei Chen, Chien-Yu Chen and Tian Xie It is certified that error appears in the above-identified patent and that said Letters Patent is hereby corrected as shown below:

In the Claims

Claim 6, Column 13, Line 59:
"proximity cards into and out reading range" should read -- proximity cards into and out of reading range --.

Signed and Sealed this
Twenty-second Day of November, 2022

Katherine Kelly Vidal
*Director of the United States Patent and Trademark Office*